US010397002B2

(12) United States Patent
Camenisch et al.

(10) Patent No.: US 10,397,002 B2
(45) Date of Patent: Aug. 27, 2019

(54) SIGNATURE SCHEME FOR HOMOMORPHIC MESSAGE ENCODING FUNCTIONS

(71) Applicant: International Business Machines Corporation, Armonk, NY (US)

(72) Inventors: Jan L. Camenisch, Thalwil (CH); Anja Lehmann, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 15/429,663

(22) Filed: Feb. 10, 2017

(65) Prior Publication Data

US 2018/0234253 A1 Aug. 16, 2018

(51) Int. Cl.

| | |
|---|---|
| ***H04L 9/00*** | (2006.01) |
| ***H04L 9/32*** | (2006.01) |
| ***H04L 9/14*** | (2006.01) |
| ***H04L 9/08*** | (2006.01) |
| ***H04L 29/06*** | (2006.01) |

(52) U.S. Cl.

CPC ............ *H04L 9/3252* (2013.01); *H04L 9/006* (2013.01); *H04L 9/0861* (2013.01); *H04L 9/14* (2013.01); *H04L 63/0428* (2013.01)

(58) Field of Classification Search

CPC ..... H04L 9/3252; H04L 9/006; H04L 9/0861; H04L 9/14; H04L 63/0428

See application file for complete search history.

(56) References Cited

U.S. PATENT DOCUMENTS 8,433,065 B2 4/2013 Gentry
8,467,535 B2 6/2013 Struik
8,522,040 B2 8/2013 Camenisch et al.
8,667,288 B2 3/2014 Yavuz
8,739,308 B1 5/2014 Roth et al.
8,744,077 B2 6/2014 Camenisch et al.
8,892,865 B1 * 11/2014 Roth .................... G06F 21/602 713/150
9,215,076 B1 * 12/2015 Roth .................... H04L 9/3247
9,268,968 B2 * 2/2016 Chen .................... H04L 9/3073
9,356,783 B2 5/2016 Joye et al.
9,489,522 B1 * 11/2016 El Defrawy .......... H04L 9/3218
9,531,540 B2 12/2016 Peeters et al.

(Continued)

FOREIGN PATENT DOCUMENTS

DE 11 2013 002 T5 5/2015
WO WO 2016/049406 A1 3/2016

OTHER PUBLICATIONS

List of IBM Patents or Patent Applications Treated as Related.

(Continued)

*Primary Examiner* — Joseph P Hirl
*Assistant Examiner* — Stephen T Gundry
(74) *Attorney, Agent, or Firm* — Scully, Scott, Murphy & Presser, P.C.; Daniel Morris, Esq.

(57) ABSTRACT

This invention relates to cryptographic signing. The disclosure provides for a signature scheme to secure digital communication using homomorphic message encoding functions. The signature may be applied to hidden messages, and the knowledge of a signature can be proved without the value of the signature being revealed. Applications of the present invention may include anonymous credentials, electronic voting, and group signatures.

7 Claims, 5 Drawing Sheets

(56) References Cited

U.S. PATENT DOCUMENTS

| | | | | |
|---|---|---|---|---|
| 9,578,505 | B2 | 2/2017 | Buhler et al. | |
| 9,749,297 | B2 | 8/2017 | Gvili | |
| 9,768,962 | B2 | 9/2017 | Acar et al. | |
| 9,787,647 | B2 * | 10/2017 | Wu | H04L 63/0428 |
| 9,906,368 | B2 * | 2/2018 | Bos | H04L 9/3247 |
| 9,973,342 | B2 | 5/2018 | Lyubashevsky et al. | |
| 10,044,503 | B1 | 8/2018 | Roth et al. | |
| 10,079,686 | B2 | 9/2018 | Camenisch et al. | |
| 10,083,310 | B1 * | 9/2018 | Lampkins | G06F 21/606 |
| 2003/0059041 | A1 * | 3/2003 | MacKenzie | H04L 9/008 380/28 |
| 2010/0142704 | A1 * | 6/2010 | Camenisch | H04L 9/0847 380/44 |
| 2011/0154465 | A1 * | 6/2011 | Kuzin | H04L 63/0815 726/9 |
| 2012/0278628 | A1 | 11/2012 | Chen | |
| 2012/0314856 | A1 | 12/2012 | Zaverucha et al. | |
| 2012/0317412 | A1 | 12/2012 | Zaverucha et al. | |
| 2013/0097420 | A1 | 4/2013 | Zaverucha | |
| 2013/0246785 | A1 | 9/2013 | Buckley et al. | |
| 2013/0246798 | A1 | 9/2013 | Buckley et al. | |
| 2013/0287207 | A1 | 10/2013 | Zaverucha et al. | |
| 2013/0290712 | A1 | 10/2013 | Zaverucha et al. | |
| 2013/0290713 | A1 | 10/2013 | Zaverucha et al. | |
| 2013/0346755 | A1 | 12/2013 | Nguyen et al. | |
| 2014/0205090 | A1 | 7/2014 | Li et al. | |
| 2014/0281525 | A1 * | 9/2014 | Acar | H04L 9/3213 713/168 |
| 2015/0063564 | A1 * | 3/2015 | Joye | H04L 9/0847 380/30 |
| 2015/0067340 | A1 * | 3/2015 | Joye | H04L 9/0869 713/175 |
| 2015/0100785 | A1 * | 4/2015 | Joye | H04L 9/008 713/168 |
| 2015/0100794 | A1 * | 4/2015 | Joye | H04L 9/008 713/189 |
| 2015/0280923 | A1 * | 10/2015 | Camenisch | H04L 63/083 713/155 |
| 2015/0288525 | A1 | 10/2015 | Camenisch et al. | |
| 2015/0295720 | A1 * | 10/2015 | Buldas | H04L 9/3247 713/176 |
| 2015/0341335 | A1 * | 11/2015 | Camenisch | H04L 9/3226 713/156 |
| 2016/0065549 | A1 | 3/2016 | Roth et al. | |
| 2016/0085955 | A1 * | 3/2016 | Lerner | G06F 21/31 726/20 |
| 2016/0134593 | A1 * | 5/2016 | Gvili | H04L 63/0428 713/170 |
| 2016/0182230 | A1 * | 6/2016 | Peeters | H04L 9/3234 380/28 |
| 2016/0316365 | A1 * | 10/2016 | Buhler | H04W 12/06 |
| 2017/0033934 | A1 * | 2/2017 | Camenisch | H04L 9/3263 |
| 2017/0070351 | A1 * | 3/2017 | Yan | G06F 21/44 |
| 2017/0141925 | A1 * | 5/2017 | Camenisch | H04L 63/107 |
| 2017/0163421 | A1 * | 6/2017 | Chase | H04L 9/3066 |
| 2017/0201371 | A1 * | 7/2017 | Yagisawa | H04L 9/008 |
| 2017/0366349 | A1 * | 12/2017 | Lyubashevsky | H04L 9/3221 |
| 2017/0366358 | A1 * | 12/2017 | Lyubashevsky | H04L 9/3255 |
| 2017/0374033 | A1 * | 12/2017 | Kovacs | H04L 9/3247 |
| 2018/0091301 | A1 * | 3/2018 | Nunez | G06F 21/606 |
| 2018/0139054 | A1 * | 5/2018 | Chu | H04L 9/3247 |
| 2018/0139223 | A1 * | 5/2018 | Yan | G06F 21/552 |
| 2018/0227278 | A1 * | 8/2018 | Camenisch | H04L 63/0442 |
| 2018/0260576 | A1 * | 9/2018 | Miguel | G06F 21/62 |

OTHER PUBLICATIONS

Catalano et al., "Homormorphic Signatures with Efficient Verification for Polynomial Functions", IACR 2014, IACR and Springer-Verlag on Jun. 13, 2014; Proceedings of CRYPTO 2014.

Hanser et al., "Blank Digital Signatures", In Proceedings of the 8th ACM SIGSAC Symposium on Information, Computer and Communications Security, ASIA CCS '13, Hangzhou, China, May 8-10, 2013, pp. 95-106.

Yu et al., "An Efficient Signature-based Scheme for Securing Network Coding against Pollution Attacks", 27th IEEE Conference on Computer Communications, (INFOCOM) Phoenix, AZ, Apr. 15-17, 2008, pp. 2083-2091.

* cited by examiner

SIGNATURE SCHEME FOR HOMOMORPHIC MESSAGE ENCODING FUNCTIONS

FIELD OF TECHNOLOGY

The present invention relates to the technical field of digital signature schemes. In particular, the present invention relates to signature schemes for homomorphic message encoding functions.

BACKGROUND OF THE INVENTION

Recently, there has been an increase in the need for systems that can protect digital data from eavesdropping, forging, and other forms of attack. As more commercial transactions and communications are handled with digital electronics, the need will increase. Additionally, the increasing sophistication of adversaries exacerbates the problem of protecting digital data.

A variety of schemes have been developed for protecting and authenticating data. The problem now faced by many is to choose a scheme from among the many that will be both secure and economical. Traditionally, printed information has been authenticated by appending the handwritten signature of a person or persons to the printed material. Modern methods for authenticating data proceed in a similar manner, except that the handwritten signature is replaced by a digital signature. In many cases, this signature consists of a set of bits that are computed by the signer based on the message being signed.

A digital signature scheme is an important primitive to secure digital communication in its own right. Moreover, it is also used as a building block for higher level cryptographic scheme such as anonymous credentials, electronic voting, group signature, etc. In such constructions, signatures are often issued on hidden messages or knowledge of a signature is proved in zero-knowledge without the value of the signature being revealed. While such tasks can be done for any signature scheme, if they need to be done efficiently, a signature scheme needs to have additional properties.

Ideally, anyone is able to verify the digital signature is the valid signature of the signer for the associated message, and that only the signer is able to generate the signature.

One of the first schemes proposed that provides such feature is by Camenisch and Lysyanskaya, where one can use so-called generalized Schnorr-proofs to efficiently prove knowledge of a signature without revealing the signature or the messages. Their scheme was used to construct many cryptographic protocols and since a number of alternative signature schemes have been proposed that other similar advantages. However, for all of these signature schemes, two party protocols are requires to issue a signature on an encrypted or committed message.

As a result of the current state of the prior art, there remains a long felt need for provably fast and secure digital signature schemes.

SUMMARY OF INVENTION

The present invention, in an embodiment, comprises a system for signing cryptographic communication, the system comprising a public key infrastructure connected to a computer communication network, a first electronic communication device operatively connected to the computer communication network and comprising a first non-transitory memory and a first process configured to generate an encoding function, where the encoding function is homomorphic, generate a decoding function, where the decoding function is homomorphic, encode a message using the encoding function, and transmit the message to a second electronic communication device, the second electronic communication device, where the second electronic communication device is operatively connected to the computer network and comprises a second non-transitory memory and a second process configured to generate a public key, transmit the public key to the public key infrastructure, generate a private key, receive the message over the computer communication network, receive the encoding function over the computer communication network, and generate a signature using the message and the encoding function. The system can be implemented as a series of method steps in embodiments.

Optionally, the first electronic communication device may be configured to verify the encoding of the message. The second electronic communication device may also be optionally configured to transmit the signature to the first electronic communication device. Advantageously, the first electronic communication device may be further configured to receive the signature to the first electronic communication device and decode the signature using the decoding function. Optionally, the first electronic communication device can be further configured to verify the signature and/or output a valid indicator. Preferably, the encoding function may be selected from the group consisting of an identity function, ElGamal encryption, and double ElGamal encryption.

Numerous other embodiments are described throughout herein. All of these embodiments are intended to be within the scope of the invention herein disclosed. Although various embodiments are described herein, it is to be understood that not necessarily all objects, advantages, features or concepts need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

The methods and systems disclosed herein may be implemented in any means for achieving various aspects, and may be executed in a form of a machine-readable medium embodying a set of instructions that, when executed by a machine, cause the machine to perform any of the operations disclosed herein. These and other features, aspects, and advantages of the present invention will become readily apparent to those skilled in the art and understood with reference to the following description, appended claims, and accompanying figures, the invention not being limited to any particular disclosed embodiment(s).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Figure 1:
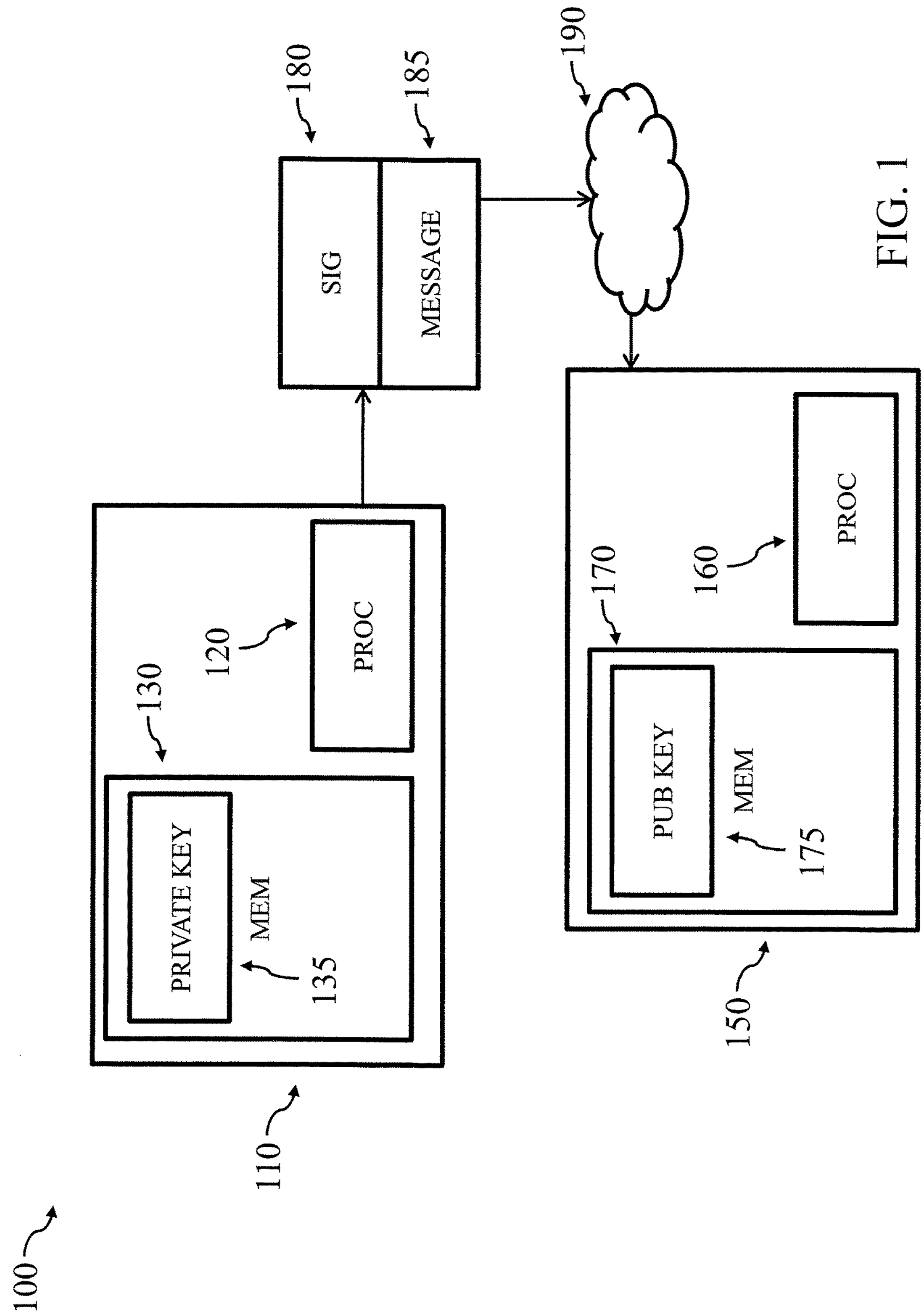
FIG. 1 illustrates a device configuration of the signature scheme, according to an embodiment of the present nvention.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical and structural changes may be made to the embodiments without departing from the spirit and scope of the present teachings. The following detailed description is therefore not to be taken in a limiting sense, and the scope of the present disclosure is defined by the appended claims and their equivalents.

Bilinear Maps

Let $\mathbb{G}$, $\tilde{\mathbb{G}}$, and $\mathbb{G}_t$ be groups of prime order q. A map e: $\mathbb{G}\times\tilde{\mathbb{G}}\to\mathbb{G}_t$ must satisfy bilinearity, i.e., $e(g^x, \tilde{g}^y)=e(g, \tilde{g})^{xy}$; non-degeneracy, i.e., for all generators $g\in\mathbb{G}$ and $\tilde{g}\in\tilde{\mathbb{G}}$, $e(g, \tilde{g})$ generates $\mathbb{G}_t$; and efficiency, i.e., there exists an efficient algorithm $\mathcal{G}(1^\tau)$ that outputs the bilinear group $(q, \mathbb{G}, \tilde{\mathbb{G}}, \mathbb{G}_t, e, g, \tilde{g})$ and an efficient algorithm to compute e(a, b) for any $a\in\mathbb{G}$ and $b\in\tilde{\mathbb{G}}$. If $\mathbb{G}=\tilde{\mathbb{G}}$, the map is symmetric and otherwise asymmetric.

Non-Interactive Proofs of Knowledge

NIZK{(w): statement(w)} denotes a generic non-interactive zero-knowledge proof protocol of knowledge of a witness w such that the statement(w) is true. Sometimes the system needs witnesses to be online-extractable, which is made explicit by denoting NIZK{($w_1$, $w_2$): statement($w_1$, $w_2$)} as the proof of witnesses $w_1$ and $w_2$, where $w_1$ can be extracted.

For concrete realizations of NIZK s, i.e., generalized Schnorr-signature proofs, the notation such as $$SPK\{(a, b, c): y = g^a h^b \wedge \tilde{y} = \tilde{g}^a \tilde{h}^c\}$$

is used. Notice that because the function e(·, g) is a group homomorphism, SPK{(a): y=e(a, g)} is a valid proof specification.

Homomorphic Encryption Schemes

The system requires an encryption scheme (EncKGen$\mathbb{G}$, Enc$\mathbb{G}$, Dec$\mathbb{G}$) that is chosen-plaintext (CPA) secure and that has a cyclic group G as message space. It consists of a key generation algorithm $$(epk, esk) \xleftarrow{s} EncKGen_G(1^\tau),$$

where τ is a security parameter, an encryption algorithm $$C_1 \xleftarrow{s} Enc_{\mathbb{G}}(epk, m_1) \text{ and } C_2 \xleftarrow{s} Enc_{\mathbb{G}}(epk, m_2),$$

then $C_1\odot C_2\in$Enc$\mathbb{G}$(epk, $m_1\cdot m_2$). Exponentiation is used to denote the repeated application of ⊙, e.g., $C^3$ denotes C⊙C⊙C.

Homomorphic Encoding Functions

Let {(Ef$\mathbb{G}^{(i)}$, Df$\mathbb{G}^{(i)}$)} be a family of pairs of probabilistic encoding and decodign functions for a group $\mathbb{G}$, where Ef$\mathbb{G}^{(i)}$ is a probabilistic function Ef$\mathbb{G}^{(i)}$: $\mathbb{G}\to[0,1]^*$, Df$\mathbb{G}^{(i)}$ a function Df$\mathbb{G}^{(i)}$:$[0,1]\to\mathbb{G}$, and for all $m\in\mathbb{G}$, m=Df$\mathbb{G}^{(i)}$(Ef$\mathbb{G}^{(i)}$(Ef$\mathbb{G}^{(i)}$(m)) holds. Sometimes the randomness used in the encoding process is made explicit and one can write C←Ef$\mathbb{G}$(epk, m, r), where r encodes all the randomness. Thus, $Ef_G(\cdot, \cdot, \cdot)$ is a deterministic algorithm. The system requires the encoding functions to be homomorphic, namely that there is an efficient operation ⊡ that, for all $C_1\in$Ef$\mathbb{G}^{(i)}$($m_1$) and $C_2\in$Ef$\mathbb{G}^{(i)}$($m_1$), then $C_1\odot C_1\in$Ef$\mathbb{G}^{(i)}$($m_1\cdot m_2$). Exponentiation is again used to denote the repeated application of ⊡.

Consider the following examples of encoding functions. Let (EncKGen$\mathbb{G}$, Enc$\mathbb{G}$, Dec$\mathbb{G}$) be a homomorphic semantically secure encryption scheme and let ($epk_{(i,j)}$, $esk_{(i,j)}$) be key pairs for it. Then the two pairs of functions given below {(Ef$\mathbb{G}^{4(i)}$, Df$\mathbb{G}^{4(i)}$)} are members of the family where the operators '⊡' and '⊡' are defined component wise.

Ef$\mathbb{G}^{4(1)}$($m_1$, . . . , $m_4$)=($m_1$, Enc$\mathbb{G}$($epk_{1,2}$, $m_2$), Enc$\mathbb{G}$($epk_{1,3}$, $m_2$), $m_4$)

Df$\mathbb{G}^{4(1)}$($C_1$, . . . , $C_4$)=($C_1$, Dec$\mathbb{G}$($esk_{1,2}$, $c_2$), Dec$\mathbb{G}$($esk_{1,3}$, $c_3$), $c_4$)

Ef$\mathbb{G}^{4(2)}$($m_1$, . . . , $m_4$)=(Enc$\mathbb{G}$($epk_{2,1}$, $m_1$), $m_2$, Enc$\mathbb{G}$($epk_{2,3}$, $m_2$), $m_4$)

Df$\mathbb{G}^{4(2)}$($c_1$, . . . , $c_4$)=(Dec$\mathbb{G}$($esk_{2,1}$, $c_1$), $c_2$, Dec$\mathbb{G}$($esk_{2,3}$, $c_3$), $c_4$)

A signature scheme that is compatible with a family {(Ef$\mathbb{G}^{(i)}$, Df$\mathbb{G}^{(i)}$)} of homomorphic message encoding functions is required, i.e., the scheme is able to sign messages that are encoded with a function Ef$\mathbb{G}$ where for some Df$\mathbb{G}$ the pair (Ef$\mathbb{G}$, Df$\mathbb{G}$) is a member of the family {(Ef$\mathbb{G}^{(i)}$, Df$\mathbb{G}^{(i)}$)}.

A signature scheme for a family of homomorphic message encoding functions with message space $\mathbb{G}$ consists of four algorithms (SigKGen$\mathbb{G}$, EncSign$\mathbb{G}$, DecSign$\mathbb{G}$, Vf$\mathbb{G}$).

SigKGen$\mathbb{G}$($1^\tau$): On input the security parameter and being parametrized by $\mathbb{G}$, this algorithm outputs a public verification key spk and secret signing key ssk.

EncSign$\mathbb{G}$(ssk, Ef$\mathbb{G}$, C): On input of a signing key ssk, encoding function Ef$\mathbb{G}$, and an encoding C, the signing algorithm outputs an "encoded" signature $\overline{\sigma}$ of C.

DecSign$\mathbb{G}$(spk, Df$\mathbb{G}$, $\overline{\sigma}$): On input an "encoded"signature $\overline{\sigma}$, decoding function Df$\mathbb{G}$, and public verification key spk, this algorithm outputs a "decoded" signature σ.

Vf$\mathbb{G}$(spk, σ, m): On input a public verification key spk, signature σ, and message $m\in\mathbb{G}$, this algorithm outputs 1 if the signature is valid and 0 otherwise.

Compatibility of the signature scheme with the homomorphic encoding now means that signatures $$\overline{\sigma} \xleftarrow{s} EncSign_{\mathbb{G}}(ssk, Ef_{\mathbb{G}}, C)$$

obtained on an encoding C Ef𝔾(m), can be decoded to a valid signature $$\sigma \xleftarrow{s} DecSign_{\mathbb{G}}(spk, Df_{\mathbb{G}}, \overline{\sigma})$$

on m.

More precisely, for correctness, the system requires that for all $$(spk, ssk) \xleftarrow{s} EncSigKGen_{\mathbb{G}}(1^{\tau}),$$

all (ef𝔾, Df𝔾) from a family of homomorphic encodings, $\{(Ef\mathbb{G}^{(i)}, Df\mathbb{G}^{(i)})\}$, all m ∈𝔾, and all random choices in Ef𝔾(·,·) and EncSign(·, ·, ·), and Vf𝔾(spk, DecSign𝔾 𝔾(spk,Df𝔾,EncSign𝔾(ssk,Ef𝔾,Ef𝔾(m))),m)=1.

Security Definition

The security definition of a signature scheme for a family of homomorphic encoding function is close to that of unforgeability for an ordinary signature scheme, the main difference being that (1) m is considered to be a vector of messages which (2) can be homomorphically encoded. For the latter, the encoding is done correctly is assumed for simplicity, as the signer encoded the messages himself or the party providing the encoded message proves to the signer that the encoding was done correctly.

---

$Exp^{ENCSIG-forge}_{\mathcal{A},ENCSIG,Ef_{\mathbb{G}}}(\tau, \mathbb{G}, \{(Ef_G^{(i)}, Df_G^{(i)})\})$:

$(spk, ssk) \xleftarrow{s} SigKGen_G(1^{\tau})$

L ← ▒
"(" m↑ * "," σ↑ *) ← ⊥s A↑(O↓Sign (ssk,",") ) (spk)
$O_{Sign}(Ef_{\mathbb{G}}^{(i)}, m_i)$
L←L▒ $m_i$ $C_i \xleftarrow{s} Ef_g^{(i)}(m_i)$ $\overline{\sigma}_i \xleftarrow{s} EncSign_G(ssk, Ef_G^{(i)}, C_i)$ ((σ)−↓i "," C↓i ")"
$Vf_{\mathbb{G}}(spk, \sigma^*, m^*) = 1$ m * ∉ L

---

Experiment $Exp^{ENCSIG\text{-}forge}_{\mathcal{A},ENCSIG,Ef_{\mathbb{G}}}(\tau, \mathbb{G}., \{(Ef_{\mathbb{G}}^{(i)}, Df_{\mathbb{G}}^{(i)})\})$:

$(spk, ssk) \xleftarrow{s} SigKGen_{\mathbb{G}}(1^{\tau})$

L ← Ø
$(m^*, \sigma^*) \xleftarrow{s} A^{O_{Sign}(ssk,.,.)}(spk)$
where $O_{Sign}$ on input $(Ef_{\mathbb{G}}^{(i)}, m_i)$:
adds $m_i$ to the list of queried messages $L \leftarrow L \cup m_i$ runs $C_i \xleftarrow{s} Ef_{\mathbb{G}}^{(i)}(m_i)$ computes $\overline{\sigma}_i \xleftarrow{s} EncSign_{\mathbb{G}}(ssk, Ef_{\mathbb{G}}^{(i)}, C_i)$ returns $(\overline{\sigma}_i, C_i)$
return 1 if $Vf_{\mathbb{G}}(spk, \sigma^*, m^*) = 1$ and $m^* \notin L$

---

Now, an instantiation of a signature scheme is given for any family $\{(Ef\mathbb{G}^{(i)}, Df\mathbb{G}^{(i)})\}$ of encoding functions for product groups $\mathbb{G}^n$ for some constant n. This means $\mathbb{G}^n$ needs to be the message space of the signature scheme. To this end, a recent structure-preserving signature scheme by Groth that works in a bilinear maps setting is extended. This scheme is denoted as the Gr signature scheme. The scheme is defined to sign a matrix of group elements. Here, the special case, where only a vector of n group elements are signed, is considered. This special case of the Gr scheme ($SigKGen\mathbb{G}^n$, $Sign\mathbb{G}^n$, $Vf\mathbb{G}^n$) is slightly adapted to the notation contained herein, and how to instantiate the additional algorithms $EncSign\mathbb{G}^n$ and $DecSign\mathbb{G}^n$ described.

The signature scheme assumes the availability of system parameters crs=(q, $\mathbb{G}$, $\tilde{\mathbb{G}}$, $\mathbb{G}_t$, e, g, $\tilde{g}$, $x_1, \ldots, x_n$) consisting of $$(q, \mathbb{G}, \tilde{\mathbb{G}}, \mathbb{G}_t, e, g, \tilde{g}) \xleftarrow{s} \mathcal{G}(1^{\tau})$$

and *n* additional random group elements $$x_i \xleftarrow{s} \mathbb{G}.$$

SigKGen𝔾(q, $\mathbb{G}$, $\tilde{\mathbb{G}}$, $\mathbb{G}_t$, e, g, $\tilde{g}$, $x_1, \ldots x_n$): Choose a random $$v \xleftarrow{s} \mathbb{Z}_q,$$

compute $y \leftarrow \tilde{g}^u$, and return *spk=y* and *ssk=v*.

Sign𝔾(ssk, $(m_1, \ldots, m_n)$): On input a message $(m_1, \ldots, m_n) \in \mathbb{G}^n$ and key *ssk=v*, choose a random $$u \xleftarrow{s} \mathbb{Z}_q^*$$

and output the signature $\sigma=(r, s, t_1, \ldots, t_n)$, where $r \leftarrow \tilde{g}^u$, $$s \leftarrow (x_1 \cdot g^v)^{\frac{1}{u}} \text{ and } t_i \leftarrow (m_i x_i^v)^{\frac{1}{u}}.$$

Vf𝔾(spk, σ,$(m_1, \ldots, m_n)$): Parse $\sigma=(r, s, t_1, \ldots, t_n)$ and spk=y and accept if $m_i, s, t_i \in \mathbb{G}$, $r \in \tilde{\mathbb{G}}$, $e(s, r)=e(g, y)\cdot e(x_i, \tilde{g})$, and $e(t_i, r)=e(m_i, \tilde{g})e(x_i, y)$.

As pointed out by Groth, a signature $\sigma=(r, s, t_1, \ldots, t_n)$ can be randomized to obtain a signature $\sigma'=(r', s', t'_1, \ldots, t'_n)$ by picking a random $$u' \xleftarrow{s} \mathbb{Z}_q^*$$

and computing $r' \leftarrow r^{u'}$, $$s' \leftarrow s^{\frac{1}{u'}}, \text{ and } t'_i \leftarrow t_i^{\frac{1}{u'}}.$$

Now, the additional algorithms to extend the Gr signature scheme into one for the family of homomorphic message encoding functions $\{(Ef_{\mathbb{G}^n}^{(i)}, Df_{\mathbb{G}^n}^{(i)})\}$ are presented. This scheme is denoted by Gr+. Let $(Ef_{\mathbb{G}^n}, Df_{\mathbb{G}^n})$ be an element of $\{(Ef_{\mathbb{G}^n}^{(i)}, Df_{\mathbb{G}^n}^{(i)})\}$ and $(C_1, \ldots, C_n)=Ef_{\mathbb{G}^n}(m_1, \ldots, m_n)$ be an encoding of the message $(m_1, \ldots, m_n)$.

$EncSign_{\mathbb{G}^n}(ssk, Ef_{\mathbb{G}^n}, (C_i, \ldots, C_n))$: On input of a correct encoding $(C_1, \ldots, C_n)$, choose a random $$u \xleftarrow{s} \mathbb{Z}_q^*,$$

and output the intermediate signature $\overline{\sigma}=(r, s, T_1, \ldots, T_n)$ with $$r \leftarrow \tilde{g}^{\frac{1}{u}} s \leftarrow (x_1 \cdot g^v)^u$$

and $(T_1, \ldots, T_n) \leftarrow ((C_i, \ldots, C_n) \odot Ef_{\mathbb{G}^n}(X_1, \ldots, x_n^v))^u$.

$DecSign_{\mathbb{G}^n}(spk, Df_{\mathbb{G}^n}, \overline{\sigma})$: Parse $\overline{\sigma}=(r, s, T_1, \ldots, T_n)$, compute $(t_1, \ldots, t_n) \leftarrow Df_{\mathbb{G}^n}(T_1, \ldots, T_n)$, and output $\sigma=(r, s, t_1, \ldots, t_n)$.

It is not hard to see that $\sigma=(r, s, t_1, \ldots, t_n)$ is a valid signature on the message $(m_1, \ldots, m_n) \leftarrow Df_{\mathbb{G}^n}(C_1, \ldots, C_n)$, and that the distribution of the signature values is the same as when the messages $m_i$ were signed directly.

Proving Knowledge of a Signature on Hidden Messages

In our construction, it is necessary that one party proves to another party that it knows a signature on some message without revealing either of them but where an encryption of (some of) the messages are provided to the verifying party. Because such proofs are of independent interest for other applications of our new signature scheme, the proofs are presented here separately.

Let $M=Enc_{\mathbb{G}^n}(epk, m)$ be the encryption of a message $m \in \mathbb{G}^n$ and let $(r, s, t_1, \ldots, t_n)$ be a freshly randomized signature on m.

Now, knowledge of a signature on the encrypted message is proven. Because the signature is freshly randomized, the prover can reveal r and s, i.e., r and s are a random instance from all pairs (r', s') that satisfy $e(s', r')=e(g, y) \cdot e(x_1, \tilde{g})$.

Next, on a high level, the prover has to compute the following proof:

$\pi_M \xleftarrow{s} NIZK\{(m, p, t): M=Enc_{\mathbb{G}^n}(epk, m, p) \wedge e(x, y)=e(t, r')/e(m, \tilde{g})\}(e, g, \tilde{g}, x, y, r', s', T, M, epk)$, where t, m, and s are elements of $\mathbb{G}^n$.

Assume that the ElGamal scheme with a CRS trapdoor is used for the encryption of the message (so that the hidden message is on-line extractable), i.e., $M=(M_1, \ldots, M_n)=((\hat{y}^{p1}, \overline{y}^{p1}, g^{p1}m_1). \ldots, (\hat{y}^{pn}, \overline{y}^{pn}, g^{pn}m_n))$ for random $$\rho_i \xleftarrow{s} \mathbb{Z}_q.$$

Furthermore, let $=(T_1, \ldots, T_n)=(y^{\nu_i}, g^{\nu_i}, t_i)$, for random $$\nu_i \xleftarrow{s} \mathbb{Z}_q,$$

be an (ordinary) ElGamal encryptions of $t=(t_1, \ldots, t_n)$ under the extraction public key $(\hat{y}, g)$ contained in the CRS (so that the signature is also on-line extractable). Thus the proof is realised as follows.

$$\pi_M \xleftarrow{s} SPK(p, v_1 1, v_1 2, t): \wedge_i^n (M_{i,0}=\hat{y}^{pi} \wedge M_{i,1}=\overline{y}^{pi} \wedge T_{i,1}=\hat{y}^{v_t} \wedge e(x_i, y)e(M_{i,2}, \tilde{g})/e(T_{i,2}, r')=e(g, r')^{-\nu_i} e(g, \tilde{g})^{pi}\}(e, g, \tilde{g}, x, y, r', s', T, M, \overline{y}),$$

A verifier must check the above proof and that $e(s', r')=e(g, y) \cdot e(x_1, \tilde{g})$ holds for the provided r' and s'. Let us analyze this SPK. The last term shows that $$e(T_{i,2}g^{-\nu_i}, r')=e(x_1, y)e(M_{i,2}, g^{-p_i}), \tilde{g})$$

holds, i.e., that $T_{i,2}g^{-\nu_i}$ is the $t_i$ part of the signature for the message $M_{i,2}$, $g^{-p_i}$. Together with the proof term, it follows that these values are encrypted in $T_i$ and $M_i$ under the respective public keys. Thus, if the CRS is chosen so that $\log_g \hat{y}$ is known to the simulator, the signature and the messages are on-line extractable.

Its algebraic properties allow one to integrate the signature scheme into higher-level protocols, making it a very powerful building block. By construction, it can be used to sign encrypted and committed messages. Furthermore, as verification of a signature consists of pairing equations only, one can perform efficient proofs of knowledge of a signature on encrypted or committed messages with generalized Schnorr signature proofs. Also, it is not overly difficult to distribute the signing process and keys to multiple parties. This novel signature scheme is a suitable basis on which to construct a variety of privacy-enabling schemes such as group signatures or anonymous credentials.

FIG. 1 illustrates a device configuration 100 of the signature scheme, according to an embodiment of the present invention. The sending device 110 contains a processor 120 and a memory unit 130. The processor is able to perform the steps of the signature scheme. The memory unit 130 contains a private key. The sending device 110 transmits the message 185 and the signature 180 over a computer network 190. The receiving device 1.50 receives the message 185 and signature 180. The receiving device contains a processor 160 and a memory unit 170. The memory unit 170 contains the public key 175. Usingthe public key 175, the message 185, and the signature 180, the processor 160 is able to verify the signature 180. The system can output a valid indicator,such as a bit indicator, packet, or other message indicating that the signature is valid.

Figure 2A:
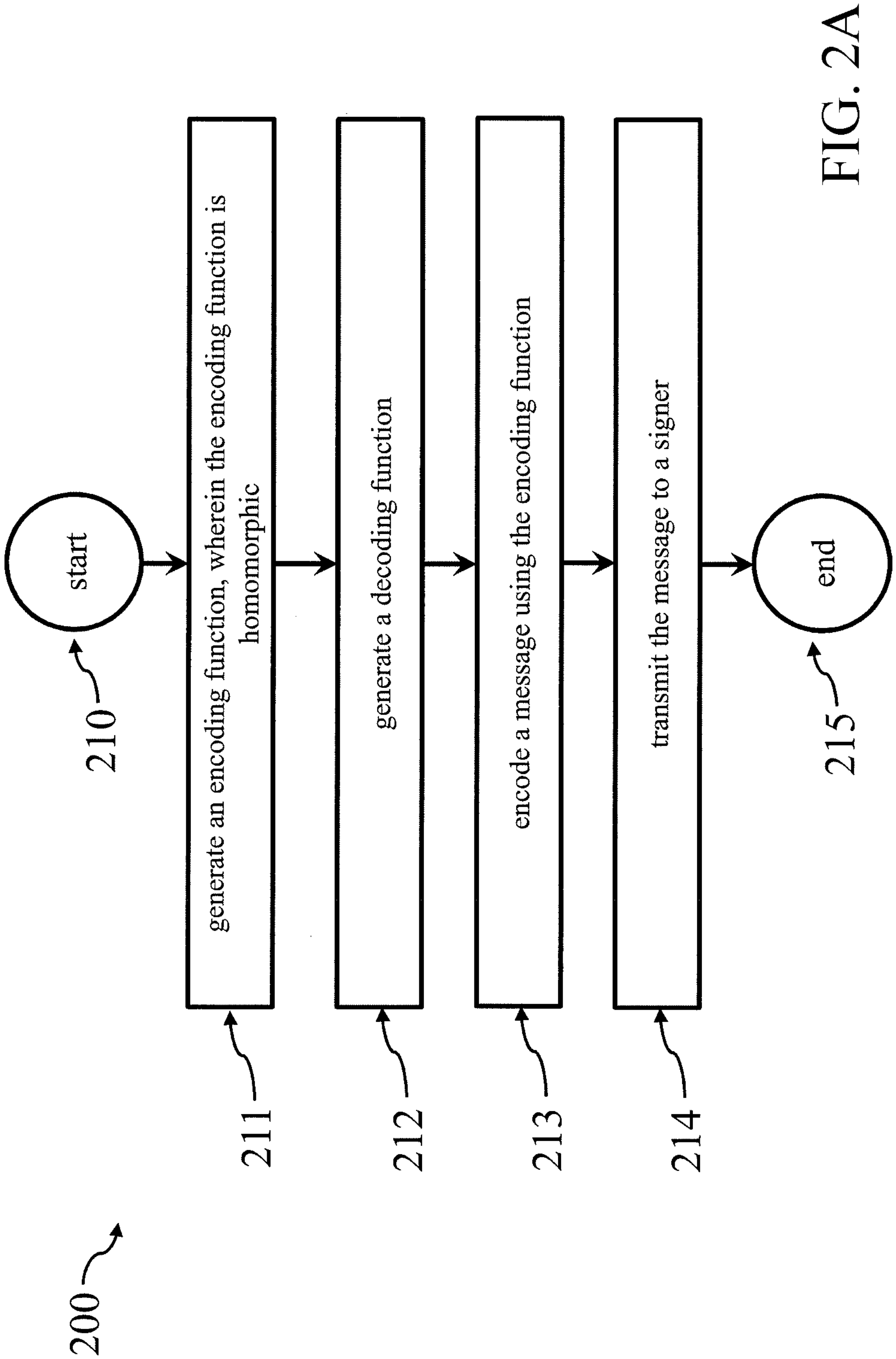
FIG. 2A illustrates a flow chart of the signature scheme process, according to an embodiment of the present invention.

FIG. 2A illustrates a flow chart 200 of a signaturescheme process, according to an embodiment of the present invention. In step 210, the process starts. In step 211, the system generates an encoding function, wherein the encoding function is homomorphic. In step 212, the system generates a decoding function. In step 213, the system encodes a message using the encoding function. In step 214, the system transmits the message to a signer. The process ends in step 215.

Figure 2B:
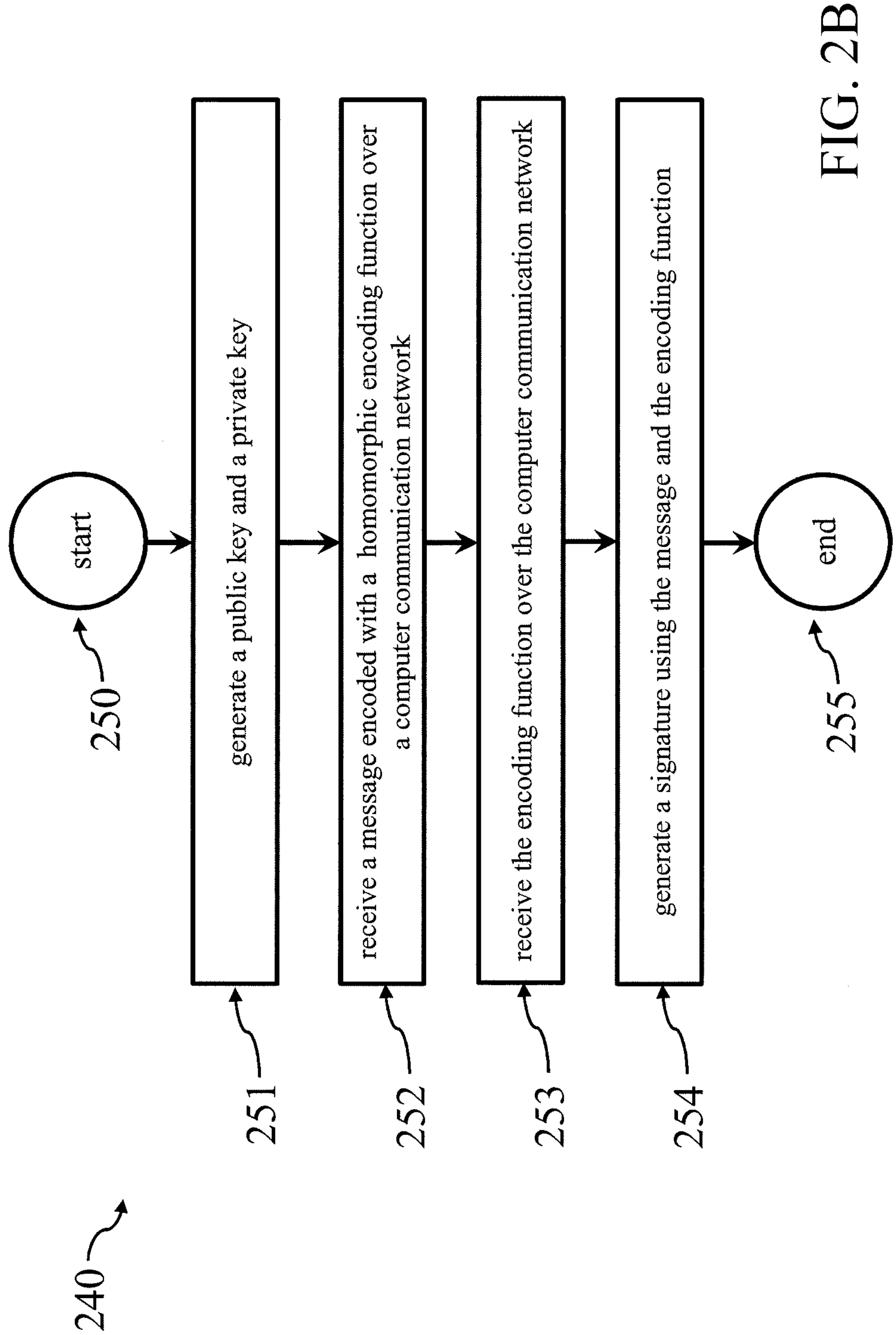
FIG. 2B illustrates a flow chart of the signature scheme process, according to an embodiment of the present invention.

FIG. 2B illustrates a flow chart 240 of a signature scheme process, according to an embodiment of the present invention. In step 250, the process starts. In step 251, the system generates a public key and a private key. The public key can be transmitted to a public key infrastructure, such as a certificate authority. The public key infrastructure may be a third-party connected to the system over the Internet or may be hosted locally or on a network. In step 252, the system receives receiving a message encoded with a homomorphic encoding function over a computer communication network. In step 253, the system receives the encoding function over the computer communication network. In step 254, the system generates generating a signature using the message and the encoding function. The process ends in step 255.

Figure 3:
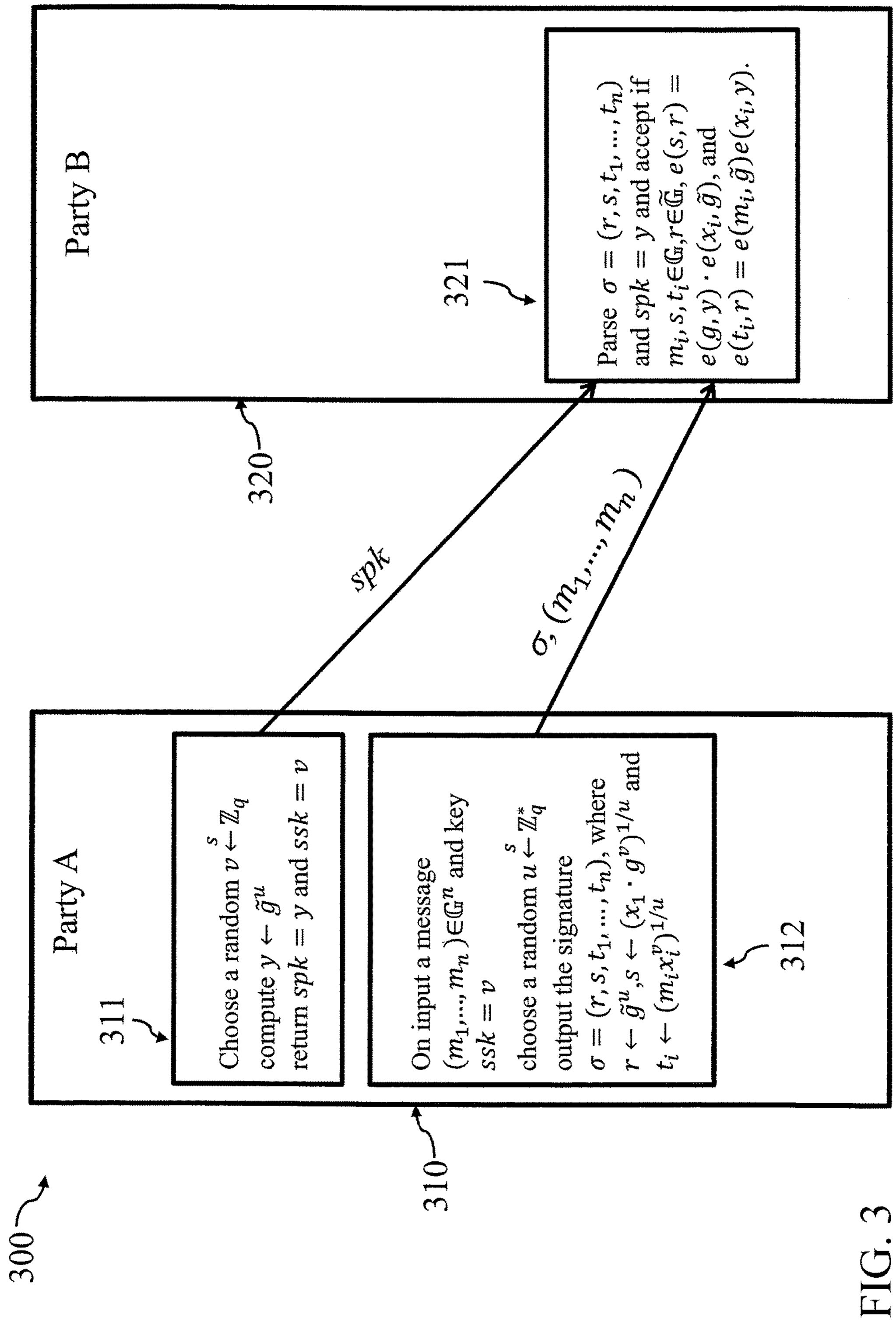
FIG. 3 illustrates the communication between parties, according to an embodiment of the present invention.

FIG. 3 illustrates a communication diagram 300 of the communication between two parties, according to an embodimeait of the present invention. Party A 310 is responsible for generating the private and public keys in block 311. The public key is transmitted to Party B 320. Party A also receives as an input a message and generates the signature in block 312. The signature is then ansmitted to Party B 320. The message may be transmitted simultaneously as the signature. Party B then uses this information to deternnne the validity of the signature in block 321.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Figure 4:
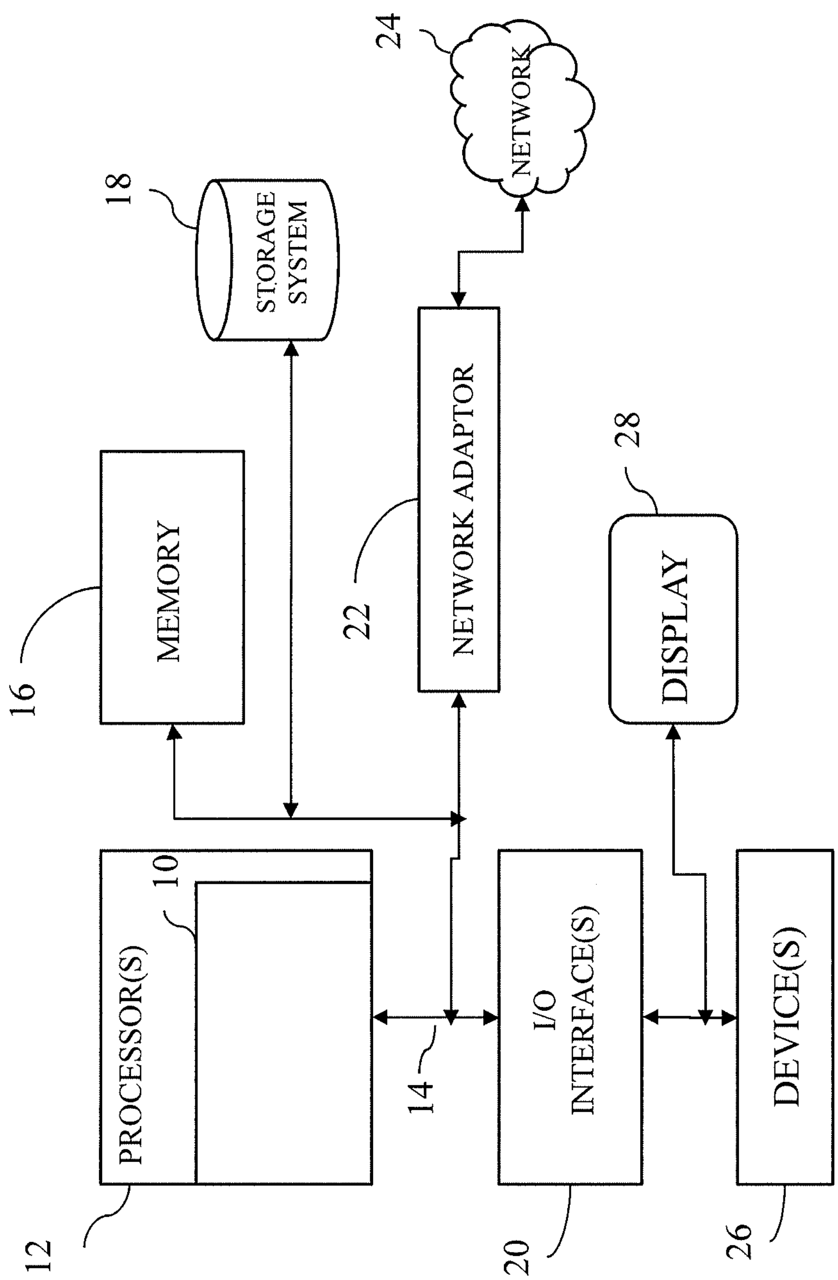
FIG. 4 is an exemplary block diagram of a computer system in which processes involved in the system, method, and computer program product described herein may be implemented.

FIG. 4 illustrates a schematic of an example computer or processing system that may implement systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The computer system illustrated in FIG. 4 is one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. A system for secure cryptographic communication, the system comprising:
- a public key infrastructure connected to a computer communication network;
- a first electronic communication device operatively connected to the computer communication network and comprising a first non-transitory memory and a first processor configured to:
  - generate an encoding function, wherein the encoding function is homomorphic;
  - generate a decoding function, wherein the decoding function decodes messages encoded by the encoding function, said encoding function, and decoding function being one pair of a family of pairs of probabilistic encoding and decoding functions for a group defining a message space;
  - encode a message using the encoding function, the message being a vector of messages of the defined message space; and
  - transmit the encoded message to a second electronic communication device;
- the second electronic communication device, wherein the second electronic communication device is operatively connected to the computer network and comprises a second non-transitory memory and a second processor configured to:
  - generate a public key;
  - transmit the public key to the public key infrastructure;
  - generate a private key;
  - receive the encoded message over the computer communication network;
  - receive the encoding function over the computer communication network; and
  - generate a signature using the encoded message and the encoding function, and transmit the message and the generated signature over the computer network to a computing device having a processor configured to verify the validity of said generated signature using said public key and message.

2. The system of claim 1, wherein the first electronic communication device is further configured to:
- verify the encoding of the message.

3. The system of claim 1, wherein the second electronic communication device is further configured to:
- transmit the signature to the first electronic communication device.

4. The system of claim 3, wherein the first electronic communication device is further configured to:
- receive the signature to the first electronic communication device; and
- decode the signature using the decoding function.

5. The system of claim 4, wherein the first electronic communication device is further configured to:
- verify the signature.

6. The system of claim 5, wherein the first electronic communication device is further configured to:
- output a valid indicator.

7. The system of claim 1, wherein the encoding function is selected from the group consisting of an identity function, ElGamal encryption, and double ElGamal encryption.

* * * * *